Nov. 20, 1934.　　　J. C. CROWLEY　　　1,981,586
COMBINED CONTROL VALVE AND PRESSURE GAUGE
Filed Dec. 8, 1931
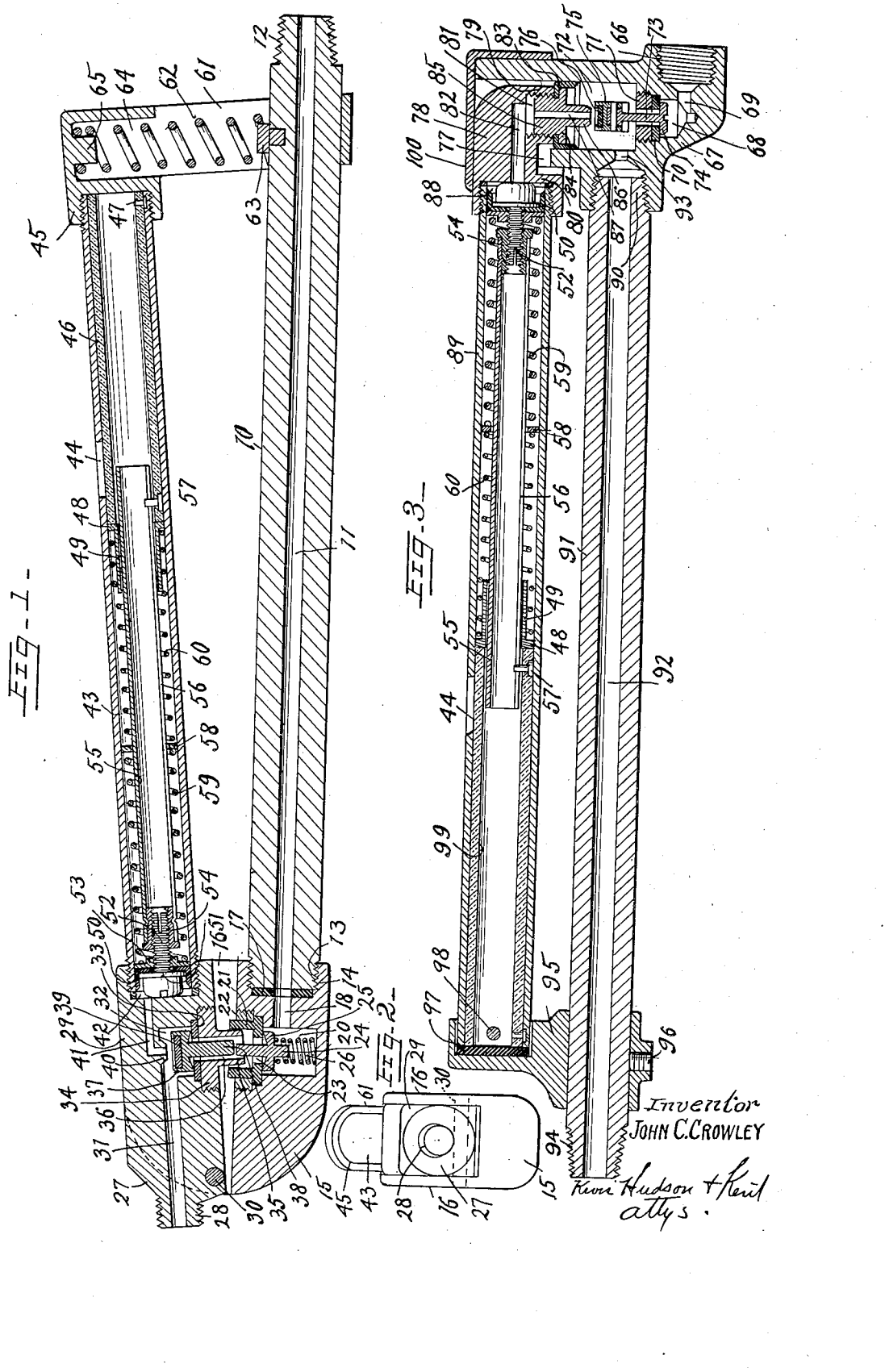
Inventor
JOHN C. CROWLEY Patented Nov. 20, 1934

1,981,586

UNITED STATES PATENT OFFICE 1,981,586

COMBINED CONTROL VALVE AND PRESSURE GAUGE

John C. Crowley, Cleveland Heights, Ohio, assignor to The Dill Manufacturing Company, Cleveland, Ohio, a corporation of Ohio Application December 8, 1931, Serial No. 579,730

12 Claims. (Cl. 152—11.5)

This invention relates to a combined control valve and pressure gauge construction that is adapted to be arranged in a fluid pressure line, such as an air line, between the source of fluid pressure supply and the outlet of the line. A construction embodying the invention has particular utility when arranged in the air line of a pneumatic tire inflating apparatus between the source of air pressure supply and the air chuck that connects the line to the valve stems of the tires being inflated.

An object of the invention is to provide an improved device having combined therein a valve for controlling the fluid pressure line and a pressure gauge for indicating the fluid pressure at the outlet side of the device when such outlet side is not in communication with the inlet side thereof.

Another object is to provide a device, such as specified in the first named object, wherein the pressure gauge is not subjected to line pressures.

A still further object is to provide a device, such as specified above, which may be readily manipulated to open the valve to permit fluid pressure to flow through the line and to close the valve to stop such flow of fluid pressure, which manipulation automatically closes or opens the passage from the outlet side of the device to the pressure gauge.

Another object is to provide a device, such as specified in the object just above mentioned, which may be manipulated readily to allow deflation of the article to which it is connected without necessitating the disconnection of the device from the article.

A still further object is to provide a combined control valve and pressure gauge construction for use in the air line of a tire inflating apparatus wherein the pressure gauge is so constructed that it can be used for testing the inflation pressures of both balloon or low pressure tires and of high pressure tires.

Additional objects and advantages will become apparent hereinafter during the detailed description of several embodiments of the invention that is to follow.

These several embodiments of the invention are illustrated in the accompanying drawing, wherein Figure 1 is a longitudinal sectional view through one form of the combined control valve and pressure gauge device;

Fig. 2 is a reduced end elevational view of the device shown in Fig. 1, looking from the left-hand side of Fig. 1; and Fig. 3 is a longitudinal sectional view through a modified form of the combined control valve and pressure gauge device shown in Fig. 1.

Referring first to Figs. 1 and 2, the device will be seen to comprise an elongated tubular member 10 having a bore extending longitudinally therethrough and forming a passage 11, one end of the member 10 being tapered and threaded as indicated at 12, while the opposite end of said member is threaded as indicated at 13. The tapered threaded end 12 of the member 10 is adapted to be connected to a fluid pressure line and forms the inlet side of the device, while the end 13 of the member 10 is screwed into a threaded counterbore 14 formed in the base 15 of a substantially U-shaped member, the arms of which are indicated in Fig. 2 at 16, it being noted that the base 15 is relatively thick while the arms 16 are relatively thin. A flexible washer 17 is arranged in the bottom of the counterbore 14 and is compressed between the bottom of the counterbore and the end 13 of the member 10 with the central opening in the washer registering with the passage 11 in the member 10 and with the passage 18 formed in the base 15 of the substantially U-shaped member. The passage 18 extends inwardly of the base 15 and communicates with a recess 20 formed in the base and extending substantially at right angles to the passage 18. The upper end of the recess 20 is formed of a pair of counterbores of different diameter, the smaller of these counterbores having a cup-shaped flexible gasket 21 clamped therein by means of a nut 22 arranged in the larger of the counterbores, this latter counterbore being threaded to permit the nut to be screwed into the same. The cup-shaped gasket 21 is provided in its bottom wall with a central opening 23, while the annular side wall of the gasket 21 extends through the nut 22 and somewhat above the base 15 of the substantially U-shaped member. A valve closes the opening 23 in the bottom wall of the cup-shaped gasket 21 and this valve comprises a valve pin 24 extending through the opening 23 and into the cup-shaped gasket 21 and a valve head portion 25 located in the recess 20 and adapted to seat upon the underside of the bottom wall of the cup-shaped gasket 21 outwardly of the circumferential edge of the opening 23. The head 25 of the valve is normally held seated against the underside of the bottom wall of the cup-shaped gasket 21 by means of a coil spring 26 arranged in the recess 20 and abutting at one end the bottom of the recess and at its other end the head 25 of the valve. Of course, since the recess 20 would be subject at all times with another, the face plate 10 is withdrawn and the scroll-lesson support and backing plate 8 removed. A new scroll sheet is then placed in the support against the plate. No nails or fastening means other than the face plate 10 and back plate 7, are required to retain the scroll mechanism in place within the frame 6.

This simple structure may be very quickly and easily fabricated and assembled without tools. The backing plate 13 with the supports 12, 12 is essentially flat and lends itself to economical storage in a compact form during manufacture.

The frame 6 may also be completely finished and dipped, before assembling the scroll and face plate, thus eliminating spraying and brush work.

In Figure 1 I have shown my improved scroll lesson support adapted to move the scroll horizontally, and in Figure 2 I have disclosed a similar structure adapted to move the scroll vertically. It is obvious that by changing the proportions of the various members, my improved scroll lesson support can be used with scrolls of various sizes that may be required to successively present the lesson objects printed thereon either vertically or horizontally.

My scroll support and backing plate combines the qualities of economy of manufacture with ease and quickness of assembly and removal. It lends itself to compact storage and may be employed with efficiency to support both vertically and horizontally movable scrolls.

Having described my invention, I claim:

1. A holder for lesson scrolls insertible in a scroll-receiving frame, comprising a backing sheet, and a scroll shaft supporting strip hingedly secured to each edge of said sheet, whereby the latter may be folded flat for storage, or the strips turned at right angles thereto to receive the scroll shafts for support within the scroll-receiving frame.

2. A holder for lesson scrolls insertible in a scroll-receiving frame, comprising a backing sheet, and a scroll shaft supporting strip hingedly secured to each edge of said sheet, and projecting beyond each side thereof, the projecting end of each strip being formed with a shaft receiving aperture, said backing sheet adapted to be folded flat for storage, or the strips turned at right angles to the sheet to receive the scroll shafts for support within the scroll-receiving frame.

3. In a scroll-receiving frame, a pair of scroll shaft supporting members insertible in said frame, a backing plate to whose ends the shaft-supporting members are hingedly secured, a scroll shaft carried by opposite supporting members, a scroll secured at its ends to said shafts, and means insertible in said shafts for rotating them to move the scroll from one shaft to the other over said backing plate.

4. In a scroll-receiving frame, a pair of scroll shaft supporting members insertible in said frame, a backing plate to whose ends the shaft supporting members are hingedly secured, the ends of said members projecting beyond the backing sheet and formed with apertures, scroll shafts inserted in the opposite apertured ends of said supporting members, a scroll secured at its ends to said shafts, and crank handles insertible in said shafts for rotating them to move the scroll from one shaft to the other over said backing plate.

HORATIO G. CRESS.

until the packing 39 carried thereby closes the passage 41 after which the engagement between the valve stems acts to unseat the valve head 25. When this occurs it will be seen that the air or other fluid pressure is free to pass through the passages 11 and 18, recess 20, through the sleeve 35, recess 32 and passage 31 to the outlet side of the device, it being noted that the pressure gauge is not subject to line pressures when the parts are in the relative position just referred to. When the operator believes the tire to be inflated at the proper pressure, he releases his grasp on the casing 43 and member 10 and the spring 62 moves the casing and member into the position shown in Fig. 1 whereupon the spring 26 and the fluid pressure in the line seats the valve head 25, while the pressure in the tire on the outlet side of the device plus gravity seats the valve head 37, and opens the passage 41. When the passage 41 is opened it will be seen that the tire pressure is then free to act on the piston of the pressure gauge and move the same inwardly against the tension of the springs 59 or 60, as the case may be, the amount of this movement being indicated through the opening or window 44 in the casing 43 and by the indicia carried by the casing 43 and sleeve 55.

Since devices of this character are used most generally with air chucks that clip or fasten onto the valve stems and eliminate the necessity of the operator holding the air chuck on the stems during the inflating operation, it is desirable that means be provided for venting or deflating the tire in case of over-inflation without requiring the removal of the air chuck from the valve stem.

Heretofore, it has been the practice to provide devices of this general character with a small valve placed in the gauge passage, which when depressed by the operator releases the air from the tire to atmosphere. This arrangement is not satisfactory since it requires the operator to use both hands and, in addition, the button on the release valve protruding beyond the body of the gauge is easily broken off when the device is put to the severe mistreatment it receives in actual service.

In the use of the device shown in Fig. 1, it is merely necessary, in order to deflate the tire, to bring the casing 43 and the member 10 to a position intermediate the closed or non-inflating position and the inflating or open position. When the casing 43 and the member 10 are in such intermediate position it will be seen that the valve head 37 will be unseated by the engagement of the pin 38 with the pin 24 but that the valve head 25 will be seated. The end of the sleeve 35 of the nut 34 will not have reached the bottom of the cup-shaped gasket 21 at such time and the air from the tire is free to escape between the sleeve 35 and gasket 21 to atmosphere.

In the form shown in Fig. 3, the device is connected at its inlet side to the fluid pressure line by means of a threaded tapered socket 66 formed in a member 67, which will be designated as the inlet member, and communicating with a recess of counterbore 68 in said member by means of a passage 69. An annular flexible washer 70 is clamped in a larger counterbore in the member 67 and at the end of the counterbore 68 by means of a nut 71 having a central opening registering with the opening in the washer and communicating with a large recess 72 in the member 67. The valve pin 73 of the main control valve extends through the openings in the washer 70 and nut 71 and is provided at one end with a valve head 74 adapted to seat on the underside of the washer 70 and at its other end with a head 75 located in the recess 72 and provided at its upper end, as viewed in the drawing, with a packing element 76. The head 75 is also provided with a transverse opening so that the action of the fluid pressure in the recess 72 upon the head 75 will be equalized.

The wall of the recess 72 in the inlet member 67 is cut away to provide a slot 77 to permit a coupling member 78 that is substantially U-shape in form, to have one leg portion 79 arranged in the recess on one side of the slot 77 while its other leg portion 80 is located outwardly of the recess and on the other side of the slot 77, it being noted that the slot 77 is of such length as to permit the coupling 78 to be moved inwardly and outwardly of the same. The leg portion 79 of the coupling is provided with a threaded bore 81 communicating with a passage 82 extending through the coupling at substantially right angles to the bore 81. A cup-shaped flexible gasket 83 is clamped against the lower end of the leg portion 79 by means of the flange 84 on the threaded nut 85, which nut is provided on its underside, as viewed in the drawing, with a reduced extension 86, the nut and the extension having a passage 87 extending therethrough. The gasket 83 and the nut 85 constitute in effect a piston for a purpose later to be explained. The coupling 78 adjacent the leg 80 thereof is provided with a threaded recess 88 communicating with the passage 82 and receiving the threaded end of a tubular casing 89, later to be referred to.

The inlet member 67 on the side thereof opposite to the threaded tapered socket 66 and intermediate the ends of the member, is provided with a threaded tapered socket in which is screwed the tapered threaded end 90 of the elongated member 91 through which extends a longitudinal bore or passage 92 that communicates by means of the short passage 93 with the recess 72 in the member 67. The end of the member 91 opposite to the tapered threaded end 90 thereof is also tapered and threaded, as indicated at 94, and constitutes the outlet end of the device and is adapted to be connected to the outlet side of the fluid pressure line or directly to the chuck, if desired. A bracket 95 is provided with an opening through which the member 91 extends and in which it is clamped to the member 91 by means of a set screw 96. The upper end of the bracket 95 is provided with a recess somewhat larger in diameter than the diameter of the tubular casing 89 previously referred to, and arranged to receive the end of the casing, it being noted that a flexible packing 97 is arranged in the recess in the bracket 95 and that the end of the casing abuts said packing. Since the recess in the bracket is somewhat larger than the diameter of the casing, it will be clear that the casing may have movement in the recess and, in fact, it is proposed to provide a pivotal mounting between the casing and bracket so that the casing 89 may be moved toward and away from the member 91. A pin 98 extends transversely through the casing and through the transparent cylinder 99 which corresponds to the cylinder 46 in the form previously described, and is supported at its opposite ends in the wall of the recess in the bracket 95.

The casing 89 constitutes the casing for the pressure gauge and is substantially identical with the casing 43 in the previously described form, in that it is provided with the opening 44 which is closed by the transparent cylinder 99 and constitutes a window through which the gauge reading may be taken. Since the remaining parts of the gauge construction are the same as the corresponding parts of the gauge described in connection with the form shown in Fig. 1, these parts will be identified by the same reference characters used to identify the parts in the form already described. It is not believed that a detailed description of the parts of the pressure gauge in the form disclosed in Fig. 3 need be set out herein. The upper end of the recess 72 of the member 67 is covered by a cover plate 100 which acts to limit movement in one direction of the gauge and coupling.

Assuming that the device shown in Fig. 3 is connected in the air line of a tire inflating apparatus and that the chuck at the outlet end of the line is applied to the valve stem of a tire being inflated, the operator squeezes the gauge casing 89 and the member 91 toward each other with the result that the U-shaped coupling 78 is similarly moved and the reduced extension 86 of the nut 85 carried by the leg portions 79 of the coupling engages the packing 76 of the head 75 of the main control valve and depresses said valve to unseat the head 74. Since the engagement between the end of the reduced extension 86 of the packing 76 closes the passage 87 through the nut 85 and unseats the head 74, it will be seen that the fluid pressure is free to pass through the counterbore 68 into the recess 72 and through the passage 92 to the chuck at the outlet side of the line. When the operator considers the tire or other article to be inflated to the proper pressure, he releases his grasp upon the casing 89 and the member 91 and the fluid pressure in the article being inflated and in the passage 92 acts upon the piston formed by the flexible cup-shaped packing 83 and the nut 85 and moves the coupling 78 outwardly in the slot 77 of the member 67 and unseats the end of the reduced extension 86 from the packing 76, the fluid pressure at the inlet side of the device at the same time causing the head 74 of the main control valve to seat on the flexible washer 70. It will be seen that when this condition occurs the fluid pressure in the article being inflated may pass through the passages 87 and 82 into the pressure gauge and causes the piston thereof to be moved against the tension of the springs, the amount of the movement of the pressure gauge piston being indicated in terms of pressure to the operator through the window or opening 44 in the casing.

It will be noted that in both embodiments of the invention illustrated herein, that the pressure gauges are not subjected to line pressure since whenever the main control valves in the devices are open the passages to the pressure gauges are closed. It will also be seen that the operator by merely squeezing the pivoted parts of the devices together, opens the main control valves and, upon releasing his grasp upon these parts, the main control valves are automatically closed and the valves controlling the passages to the pressure gauge are automatically opened.

Although several preferred embodiments of the invention have been illustrated and described herein, it should be understood that the invention is susceptible of various modifications and adaptations within the scope of the appended claims.

Having thus described my invention, I claim:

1. In a device of the character described having an inlet opening and an outlet opening, a pair of members pivotally connected together adjacent one of their ends, each of said members having a recess therein and being provided with a passage leading from said recess, one of said passages communicating with said inlet opening and the other of said passages communicating with said outlet opening, one of said members having a pressure gauge associated therewith and being provided with a second passage leading from the recess therein to said gauge, a valve arranged in the recess of said last named member and adapted to close the passage leading to said gauge, means carried by both recesses and having telescoping sleeve portions connecting the recesses when the members are moved toward each other, a valve in the recess of the other member and normally seated on the said means in said recess to close the sleeve of the same, said valves having pins extending through said sleeves and engaging each other to open one and close the other upon said movement of said members toward each other, and means for normally urging said members apart.

2. In a device of the character described having an inlet opening and an outlet opening, a member having a recess therein and provided with passages leading to and from said recess and communicating with said inlet and outlet openings, a valve for closing the passage leading to said recess, a second member slidable in said recess and having a pressure gauge associated therewith and being provided with a passage communicating with said recess and said gauge, said second member and said valve having cooperating portions acting when said second member is moved inwardly of said recess to close the passage in said second member and open the passage in said first named member leading to said recess.

3. In a device of the character described having an inlet opening and an outlet opening, a member having a recess therein and provided with passages leading to and from said recess and communicating with said inlet and outlet openings, a valve for closing the passage leading to said recess, a second member slidable in said recess and having a pressure gauge associated therewith and being provided with a passage communicating with said recess and said gauge, said second member including a piston workable in said recess, said valve and said second member having cooperating portions acting when said second member is moved inwardly of said recess to close the passage in said second member and open the passage in said first named member leading to said recess.

4. In a device of the character described having an inlet opening and an outlet opening, a member having a recess therein and provided with passages leading to and from said recess and communicating with said inlet and outlet openings, a valve for closing the passage leading to said recess, a second member slidable in said recess and having a pressure gauge associated therewith and being provided with a passage communicating with said recess and said gauge, said second member including a piston workable in said recess, said valve and said second member having cooperating portions acting when said second member is moved inwardly of said recess to close the passage in said second member and to open the passage in said first named member leading to said recess, and means pivotally connecting said gauge with said first named member.

5. In a device of the character described having an inlet opening and an outlet opening, a member having a recess therein and provided with a passage extending from said recess to said inlet opening, a second member associated with the first member to move relatively thereto and having a recess therein adjacent the recess in the first named member and provided with passages extending from said recess, a pressure gauge associated with said second member, said outlet opening being connected with one of the passages in said second member and said gauge being connected with another of said passages, means provided with an opening arranged in the recess in each of said members and cooperating when said members are moved toward each other to connect said recesses, a valve arranged in the recess in said first named member and normally closing the opening in the means arranged therein, and a valve arranged in the recess in the second member and adapted to close the passage therein that is connected to said pressure gauge, said valves having stem portions engageable with one another upon said movement of said members toward each other to open the first named valve and close the second named valve.

6. In a device of the character described having an inlet opening and an outlet opening, a member having a recess therein and a passage extending from said recess to said inlet opening, a second member pivotally connected with the first member to move toward and away from the same and having a recess therein adjacent the recess in the first member and provided with passages extending from said recess, a pressure gauge associated with said second member, said outlet opening being connected with one of the passages in said second member and said gauge being connected with another of the passages therein, means provided with an opening arranged in the recess in each of said members and cooperating when said members are moved toward each other to connect said recesses, a valve arranged in the recess in the first member and normally closing the opening in the means arranged therein, and a valve arranged in the recess in the second member and adapted to close the passage therein that is connected to said pressure gauge, said valves having stem portions engageable with one another upon said movement of said members toward each other to open the first named valve and close the second named valve.

7. In a device of the character described having an inlet opening and an outlet opening, a member having a passage therethrough connected with the inlet opening of the device, a valve normally closing said passage, a member associated with said first member for movement relative thereto and including a pressure gauge and being provided with a passage connected with the outlet opening of the device and with a passage connecting said last named passage with said gauge, a valve adapted in one position to close the first mentioned passage in said second named member and in another position to close the passage connecting said gauge therewith, said members having cooperating portions forming a closed passage between the members and connecting the two first mentioned passages therein when said members are moved toward each other a predetermined amount, but being opened to atmosphere at intermediate positions of said members, and said valves having cooperating portions engageable with each other upon movement of said members toward each other to first move said second named valve to a position intermediate its two above mentioned operative positions and to then open said first named valve and move the second named valve to the second of its above mentioned two operative positions.

8. In a device of the character described having an inlet opening and an outlet opening, two pivotally connected members one of which includes a pressure gauge, each of said members being provided with a passage therein, one connected to the inlet opening and the other to the outlet opening of the device, said gauge carrying member being provided with a second passage connecting the first named passage in said member with said gauge, opposed valve seats in said last named member adjacent the passages therein, a valve alternately movable to seated position with respect to either of said seats to control the passages in said member, a valve in the other of said members normally closing the passage therein, said members being provided with interfitting portions forming a closed passage between the passages therein when the members are moved toward each other a predetermined amount, but being open to atmosphere at other positions of said members, said valves having cooperating portions engageable with each other upon movement of said members to first unseat said first named valve with respect to one of its seats and then to seat said valve with respect to its other seat and to unseat said last named valve.

9. In a device of the character described having an inlet opening and an outlet opening, a pair of pivotally connected members movable toward and from each other, one of said members including a pressure gauge and being provided with a passage adapted to connect said gauge with the outlet opening of the device and the other of said members being provided with a passage adapted to be placed in communication with the inlet and outlet openings of the device, means for closing said first named passage, and means normally closing said last named passage, said first named means being rendered effective and said second named means being rendered ineffective by the pivotal movement of said members toward each other.

10. In a device of the character described having an inlet opening and an outlet opening, a pair of pivotally connected members movable toward and from each other, one of said members including a pressure gauge and being provided with a passage adapted to connect said gauge with the outlet opening of the device and the other of said members being provided with a passage adapted to be placed in communication with the inlet and outlet openings of the device, means for closing said first named passage, and means normally closing said last named passage, said means operatively engaging each other upon pivotal movement of said members toward each other to render said first named means effective and said second named means ineffective.

11. In a device of the character described having an inlet opening and an outlet opening, a member having a passage therethrough and connected with the inlet opening of the device, a valve normally closing said passage, a member associated with said first named member for relative movement toward and from the same and including a pressure gauge and being provided with a passage connected with the outlet opening of the device, said last named member also being provided with a passage connecting said last named passage with said gauge, and a valve adapted to close said gauge connecting passage, said members having cooperating portions which connect the two first named passages in the members when said members are moved toward each other, and said valves having cooperating portions operable upon said movement to open said first named valve and close said second named valve.

12. In a device of the character described having an inlet opening and an outlet opening, a member having a passage therethrough and connected with the inlet opening of the device, a valve normally closing said passage, a member pivotally connected to said first named member to move toward and from the same and provided with a passage connected with the outlet opening of the device, said last named member including a pressure gauge and being provided with a second passage connecting said last named passage with said gauge, and a valve adapted to close said gauge connecting passage, said members having cooperating portions which connect the two first named passages in the members when said members are pivotally moved toward each other, and said valves having portions operable upon said movement to open said first named valve and close said second named valve.

JOHN C. CROWLEY.